US011386645B2

(12) United States Patent
Wang et al.

(10) Patent No.: US 11,386,645 B2
(45) Date of Patent: Jul. 12, 2022

(54) DATASET DRIVEN CUSTOM LEARNING FOR MULTI-SCALE OBJECT DETECTION

(71) Applicant: INTERNATIONAL BUSINESS MACHINES CORPORATION, Armonk, NY (US)

(72) Inventors: Junsong Wang, Beijing (CN); Jie Zhang, Zibo (CN); Qing Wang, Beijing (CN); Yonghua Lin, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 16/918,598

(22) Filed: Jul. 1, 2020

(65) Prior Publication Data
US 2022/0004759 A1 Jan. 6, 2022

(51) Int. Cl.
G06V 20/00 (2022.01)
G06K 9/62 (2022.01)
G06V 10/44 (2022.01)

(52) U.S. Cl.
CPC ........... *G06V 20/00* (2022.01); *G06K 9/6256* (2013.01); *G06V 10/449* (2022.01)

(58) Field of Classification Search
CPC .................... G06V 10/454; G06K 9/6232
See application file for complete search history.

(56) References Cited

U.S. PATENT DOCUMENTS

| 2017/0147905 | A1 | 5/2017 | Huang et al. |
| 2017/0169315 | A1 | 6/2017 | Vaca Castano et al. |
| 2017/0206431 | A1* | 7/2017 | Sun ...................... G06V 10/454 |
| 2018/0157386 | A1* | 6/2018 | Su .......................... H04L 67/22 |
| 2019/0043168 | A1* | 2/2019 | Rampal ................. G06T 3/4046 |

OTHER PUBLICATIONS

Y. Liu, H. Li, J. Yan, F. Wei, X. Wang and X. Tang, "Recurrent Scale Approximation for Object Detection in CNN," 2017 IEEE International Conference on Computer Vision (ICCV), 2017, pp. 571-579, doi: 10.1109/ICCV.2017.69. (Year: 2017).*

Mell et al., "The NIST Definition of Cloud Computing", Recommendations of the National Institute of Standards and Technology, NIST Special Publication 800-145, Sep. 2011, 7 pages.

(Continued)

*Primary Examiner* — Ross Varndell
(74) *Attorney, Agent, or Firm* — Robert D. Bean

(57) ABSTRACT

According to one embodiment, a method, computer system, and computer program product for generating anchors and selecting feature maps for a multi-scale object detection program based on analysis of the dataset is provided. The present invention may include generating a scale distribution of one or more scales of ground-truth objects, and, based on the scale distribution, dividing the effective scale range into a number of anchors greater than zero; furthermore, the invention may include generating a ratio distribution of ratios of the ground-truth objects; based on the ratio distribution, generating a ratio for at least one of the number of anchors; determining a template scale of one or more feature maps; and assigning the number of anchors to the feature maps based on the relative size of a scale of an anchor matching the relative size of a template scale of a feature map.

20 Claims, 5 Drawing Sheets

(56) References Cited

OTHER PUBLICATIONS

Cai et al., "A Unified Multi-scale Deep Convolutional Neural Network for Fast Object Detection", arXiv:1607.07155v1 Jul. 25, 2016, pp. 1-16.

Fang et al., "Concise feature pyramid region proposal network for multi-scale object detection", The Journal of Supercomputing, Published online Aug. 30, 2018, 11 pages.

Lin et al., "Feature Pyramid Networks for Object Detection", arXiv:1612.03144v2, Apr. 19, 2017, pp. 1-10.

Ren et al., "Faster R-CNN: Towards Real-Time Object Detection with Region Proposal Networks", arXiv:1506.01497v3, Jan. 6, 2016, pp. 1-14.

\* cited by examiner

DATASET DRIVEN CUSTOM LEARNING FOR MULTI-SCALE OBJECT DETECTION

BACKGROUND

The present invention relates, generally, to the field of computing, and more particularly to computer vision.

Computer vision is a field concerned with equipping computers with the means to approximate the functionality of the human visual system. In practice, this entails utilizing computers to extract meaningful information from digital images, a task that, while easy for humans, is extraordinarily difficult for computers. Extracting meaningful information from an image may entail transforming the visual images into descriptions of the world that can interface with other cognitive processes so as to produce appropriate reactions. This image understanding can be seen as the disentangling of symbolic information from image data using models constructed with the aid of geometry, statistics, and learning theory. While many approaches to the task have been implemented over the past few decades, there remains a long way to go before digital image recognition begins to approach the speed and accuracy of a human being.

SUMMARY

According to one embodiment, a method, computer system, and computer program product for generating anchors and selecting feature maps for a multi-scale object detection program based on analysis of the dataset is provided. The present invention may include generating a scale distribution of one or more scales of one or more ground-truth objects, and, based on the scale distribution, dividing the effective scale range into a number of anchors greater than zero; furthermore, the invention may include generating a ratio distribution of one or more ratios of the one or more ground-truth objects; based on the ratio distribution, generating a ratio for at least one of the number of anchors; determining a template scale of one or more feature maps; and assigning the number of anchors to the feature maps based on the relative size of a scale of an anchor matching the relative size of a template scale of a feature map.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
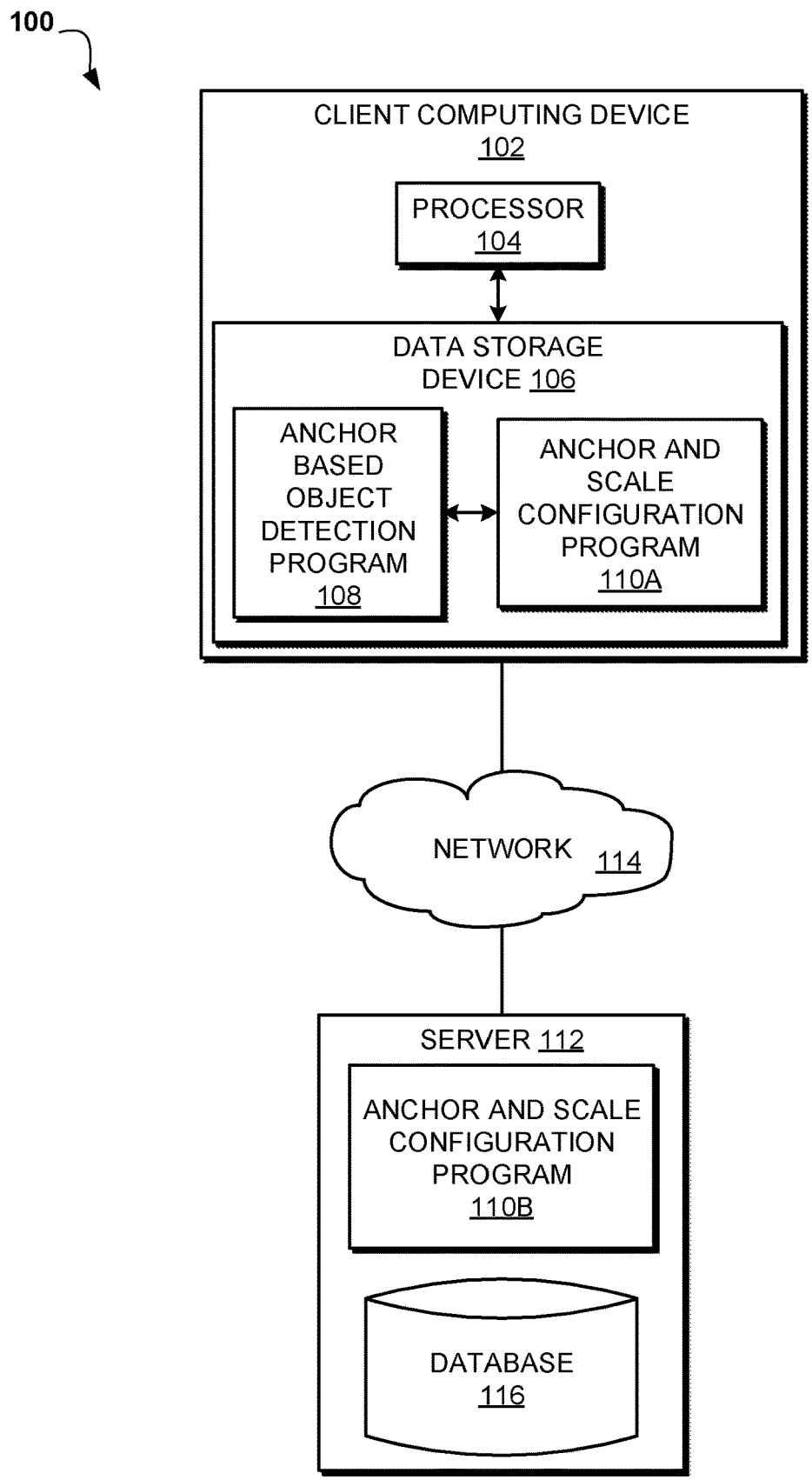
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to computer vision. The following described exemplary embodiments address, at least in part, the problem of generating anchors and selecting feature maps for a multi-scale object detection program without overloading system resources and/or slowing down the object detection process, while achieving useful levels of accuracy; generating many anchors or region proposals, or extensively customizing the anchors, may improve accuracy, but is too resource-intensive in a field where the ideal is real-time computer vision, and increased resource loads may jeopardize achieving useful object detection speeds. On the other hand, generating too few anchors, or anchors that do not efficiently represent the dataset, may severely damage accuracy. Therefore, a middle way is required to achieve useful amounts of accuracy with a minimum of resource usage; the following described exemplary embodiments provide a system, method, and program product to address this problem by generating anchors based on an analysis of the dataset. Therefore, the present embodiment has the capacity to improve the technical field of computer vision by tailoring the scales and ratios of the anchors to the input data, enabling accurate detection of objects in images even where the image contains multiple objects which differ from each other significantly in terms of size and proportion, without causing a greater drain on system resources.

As previously described, computer vision is a field concerned with equipping computers with the means to approximate the functionality of the human visual system. In practice, this entails utilizing computers to extract meaningful information from digital images, a task that, while easy for humans, is extraordinarily difficult for computers. Extracting meaningful information from an image may entail transforming the visual images into descriptions of the world that can interface with other cognitive processes so as to produce appropriate reactions. This image understanding can be seen as the disentangling of symbolic information from image data using models constructed with the aid of geometry, statistics, and learning theory. While many approaches to the task have been implemented over the past few decades, there remains a long way to go before digital image recognition begins to approach the speed and accuracy of a human being.

One common computer vision technique for extracting meaningful information from images is object detection, where instances of objects are located within images. Typically, this technique leverages machine learning to improve performance over time and produce meaningful results. However, object detection approaches often perform best when detecting objects of similar size and scale; accuracy may suffer when dealing with both large and small objects. In response, anchor/multi-scale-based object detection techniques were developed to handle objects of disparate size by using multiple scales and ratios to describe objects of different sizes and proportions. The more scales and ratios that are utilized, the more accurately a broader range of object sizes and proportions that can be described, and the better the accuracy of the system in identifying objects. However, utilizing a large number of scales results in a large number of region proposals, which can be time consuming and resource intensive, and utilizing a large number of ratios is also time consuming as mismatched ratios are useless for training. Consequently, most multi-scale object detection methods rely on and are optimized for public evaluation datasets, such as the PASCAL VOC or the COCO datasets, even though in reality the dataset distribution (such as scale, ratio, and categories) may be significantly different from the public evaluation dataset. In such a situation, the multi-scale object detection method uses parameters based on the public, or default, datasets, which cannot produce accurate results if the training dataset differs meaningfully from the public datasets. Customizing the ratios and scales based on the dataset may be desirable; however, using the machine learning model to customize object detection for each task may result in serious performance losses, as well as high throughput. Even some multi-scale object detection approaches that use two-stage object detectors and incorporate multi-scale region proposals can fail to customize the scale, for example by pre-defining the scale without considering the characteristics of the dataset, or training the object detector on a single scale, which results in scales that are not tailored to the characteristics of the dataset and potentially losses in accuracy and/or efficiency.

Of the multi-scale detection algorithms currently available, some, such as Single Shot Detectors (SSD) and You Only Look Once (YoLo), use one stage, and others, such as Faster Region-based Convolutional Neural Networks (FRCNN), use two stages. Single-stage detectors treat object detection as a simple regression problem by taking an input image and learning the class probabilities and bounding box coordinates in one step; a two-stage detector separates the object detection into two steps, where the first stage may take an input image and output regions where objects may be present (also known as region proposals). This first stage may employ a region proposal network (RPN). The second stage takes these region proposals and classifies them into object classes, identifying the object within the region proposal. Both types of detectors have advantages and disadvantages. As such, it may be advantageous to, among other things, implement a system that can not only used with a one-stage object detectors, such as Fully Convolutional Network (FCN) or Single Shot Detectors (SSD), but also with two-stage object detectors, such as FRCNN; furthermore, it may be advantageous to implement a system which, rather than hyper parameter tuning or auto machine learning, utilizes a quantitative method of anchor generation and feature map selection which uses multi-scale anchors with multi-ratios customized based on the characteristics of the training dataset, applies the multi-scale anchors to suitable feature maps, and selects the best set of feature maps for regression.

According to at least one embodiment, the invention is a system and method for generating anchors for an anchor-based multi-scale object detector based on analysis of a training dataset.

As used herein, the anchor corresponds to an object within an image, and describes a rectangular bounding box that encloses the object and represents the size, general proportions, and position of the object within the image. The anchor may further comprise the class of the object, and an anchor number. The class of the object may include all object types that share common characteristics, for example faces, cars, circles, humans. The anchor number may be a unique number assigned to each anchor to differentiate it from the others. The bounding box of the anchor is described by two values: a ratio, which enumerates the height of the rectangle proportional to its width, and a scale, which enumerates the size of the object.

According to at least one embodiment, generating anchors may include calculating the scale of each ground truth object in the training dataset, and generating a scale distribution. The ground truth object may be the correct or ideal bounding box and class of a given object, against which the system may compare generated anchors to measure the accuracy of the generated anchors. The ground-truth objects may be, for example, predefined in the training dataset or in an annotation file associated with the training dataset. The annotation file may be the labeling file for an image, which may include the object bounding box information and general information for the image, such as image name, size, objects width/height, class, et cetera. The system may calculate the scale of each ground truth object, which may entail simply retrieving the pre-defined scale of each ground truth object, and then express the calculated scales in the form of a range. The range of scales of the ground truth objects may be mathematically expressed as follows: where $$f(x)(1 \leq x \leq L, \ L \text{ is the max object scale of dataset})$$

is the sorted scale probability of the dataset, the major scale range is expressed as $[\text{scale}_{min}, \text{scale}_{max}] \int_{\text{scale}_{max}}^{+\infty} f(x)dx = \sigma$, where $\sigma$ is a confidence threshold which may be pre-defined based on user requirements. In some embodiments, the scales may pertain to any and all object classes within the training dataset.

In some embodiments of the invention, the system may utilize the sorted scale distribution to divide the effective scale range into several anchors with different scales. For example, the system may divide the interval into N parts, where N is expressed as:

$$N = \begin{cases} N_{max}, & \text{if } \log_2 \frac{scale_{max}}{scale_{min}} \geq N_{max} \\ \log_2 \frac{scale_{max}}{scale_{min}}, & \text{else} \end{cases}$$

And where N_max is the available number of scales. N may be any number of scales/anchors, and may be expressed using an equation that takes into account the minimum and maximum scales of the training dataset. While power of two is illustrated herein, one skilled in the art would recognize that a number of different equations may be used to express N. N and N_max may be hyper-parameters, which is to say, parameters that are pre-set before learning begins. The size of N_max may be based on a series of factors; for example, if processing time is not considered, N_max may be set to a large value. However, in order to tradeoff model accuracy and inference speed, N_max may not be too large. For example, N_max could be a number less than 10. Considering the object scale follows normal distribution in most cases, the system may not consider some outlier scales in certain embodiments. Once the scales pertaining to anchors have been selected, the system may then express the scale range of the anchors as:

$$scale_{min}, 2*scale_{min}, 4*scale_{min}, \ldots, N*scale_{min}$$

In some embodiments of the invention, the system may calculate the ratio of each ground-truth object in the training dataset and generate distribution of the ratios. The ground truth objects may be pre-defined or labeled with height and width information and the system may calculate the ratio of height to width for each ground truth object. The system may then express the ratios in the form of a distribution, from the minimum ratio in the training dataset to the maximum ratio. In some embodiments, the ratios may pertain to any and all object classes within the training dataset.

In some embodiments of the invention, the system utilizes a sorted ratio distribution to determine the ratio for each anchor. The system may accordingly select a number of ratios that is equivalent to the number of selected scales. In some embodiments of the invention, for example where a quick response in nearly real time is desired, the system may determine the ratio for each anchor of the region proposal through a predefined approach; the predefined approach may involve using predefined ratios, and is most useful when there is insufficient time to train the ratios. The pre-defined ratios may be taken from a public dataset. Under the predefined approach, the system may select pre-defined ratios that are not based on the training dataset. For example, in some embodiments of the invention, given N ratios, the system uses unified sampling in the major ratio range, where each given ratio Ri is defined by the equation:

$$R_i = R_{min} + i * \frac{R_{max} - R_{min}}{N}, 1 \leq i \leq N.$$

In some embodiments of the invention, such as where accuracy is desirable over speed, the system may determine the anchor ratios of the region proposal through a cross-validation (exploration) approach. The cross-validation approach is best suited for fine-grained optimization where time and/or system resources are available in sufficient amounts, and may involve verifying the different ratios one by one through repeated training to determine the accuracy of the model, and when the accuracy of the model reaches a threshold level of accuracy, the system selects anchor ratios. For example, given N ratios, the system may start with the first ratio, train on the training dataset, and obtain the accuracy on the validation set, then repeat with ratios 2-N, until Accuracy (i)-Accuracy(i+1)<β, where β is the accuracy threshold. The accuracy threshold may be a hyper-parameter, and may be defined prior to the learning process by the user or retrieved from a data repository or dataset. The accuracy threshold may represent the desired level of accuracy that the model must achieve. The validation dataset may be a subset of the training dataset; in some embodiments the system may calculate model accuracy by splitting the input dataset into training, validation and testing datasets with the relative size of each dataset as a percentage of the input dataset defined by a ratio, such as 7:2:1.

According to at least one embodiment, the invention is a method for selecting feature maps for regression by minimizing the gap between the scale of the selected anchors and template scale of the feature maps and ensuring that the receptive field is larger than the assigned scale by a predetermined margin.

The feature maps may be the results of applying filters or weights to an input image, or regions in an input image, as part of the process of identifying objects within the input image. The feature maps may be generated through convolution, or the application of filters with different kernels. There may be multiple feature maps generated from different neural network layers. Even for the same layer, the output may also have multiple dimensions, which may change depending on the neural network being used. In some embodiments of the invention, for instance where the object detector in use is a convolutional neural network (CNN), each feature map may have its own effective receptive field (ERF). The receptive field may be the "field of view" of a unit in a layer of the CNN; while in fully connected networks, the value of each unit may be the entire image, in a CNN may only depend on a region of the input, which is the receptive field. Since nothing outside the receptive field is considered, the receptive field must be carefully sized to encompass the entire relevant image region, or object detection performance will suffer. The ERF may be a sub-region of the receptive field defined as the region containing input pixels with a non-negligible impact on the output.

In some embodiments, the feature maps may further have a template scale (TS) representing the ratio of network input size to the feature map size. In some embodiments, the template scale may be the downsampling of the corresponding feature map; for example, if the input image resolution is 1024*1024, and after the convolution and pooling layers of a neural network the resolution of the current feature is 32*32, the template scale would be 32. In some embodiments, for example in a convolutional neural-network-based object detection method, the downsampling may be 2 for a downsampling layer such as pooling, resulting in a template scale of 16, 32, 64, et cetera.

In some embodiments of the invention, the system may minimize the gap between the scale of the selected anchors and the template scale of the feature maps by assigning the smallest anchor to the closest feature map in terms of template scale, and assigning the subsequent anchors by sequence. For example, the system may select the feature map by mapping the scale_min, which may be the smallest or minimum scale of the range of scales, to the feature map with the closest template scale according to the following equation:

$$\text{Feature map index} = \text{argmin} \|TS_i - \text{scale}_{min}\|$$

where argmin may be an abbreviation for the "arguments of the minimal." Argmin may be the points, or elements, of the domain of some function at which the function values are minimized. The system may map the scales besides the minimum scale as a sequence; for example, if the minimum scale was mapped to the ith feature map, then 2*scale_min will be mapped to the (i+1)th feature map. The template scale may be a predetermined value, or hyperparameter.

In some embodiments of the invention, the system may select a number of feature maps by minimizing the gap between the scale of the selected anchors and template scale of the feature maps. The system may do so by checking whether the effective receptive field (ERF) is larger than the assigned scale with the following threshold:

$$\frac{ERF_i}{scale_i} > \alpha$$

If the ERF is larger than the assigned scale, the ERF can encompass all of the features of the object under detection. If the ERF is smaller, than the ERF can only encompass a part of the object, making accurate detection much more difficult, or impossible. In some embodiments, if this criterion fails, the system may use a feature map to enlarge the ERF of the current feature map. One method may include, for example using a method in the feature pyramid network (FPN). A FPN may generate multiple feature map layers (multi-scale feature maps); if each ERF is larger than the scale_max, then the deepest feature map could include the object features. Accordingly, the deepest feature map should satisfy the equation:

$$\frac{ERF_i}{\max(scale_i)} > \alpha$$

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for generating anchors and selecting feature maps for a multi-scale object detection program based on analysis of the dataset.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run an anchor-based object detection program 108 and an anchor and scale configuration program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively. In some embodiments of the invention, client computing device 102 may include or be in communication with a camera, which may be used to capture images for multi-scale object detection.

Anchor-based object detection program 108 may be any program for identifying one or more objects within a digital image which employs anchor-based object detection methods. In other words, anchor-based object detection program 108 is a program that uses multiple pre-defined anchors to capture the scale and aspect ratio of specific object classes to detect. Anchor-based object detection program 108 may employ multi-stage object detection methods, such as Faster Region-based Convolutional Neural Networks (FRCNN), or single-stage object detection methods, such as Single Shot Detectors (SSD).

The server computer 112 may be a laptop computer, netbook computer, personal computer (PC), a desktop computer, or any programmable electronic device or any network of programmable electronic devices capable of hosting and running an anchor and scale configuration program 110B and a database 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the anchor and scale configuration program 110A, 110B may be a program capable of generating anchors and selecting feature maps for a multi-scale object detection program based on analysis of the dataset. The anchor and scale configuration program 110A, 110B may be located on client computing device 102 or server 112 or on any other device located within network 114. Furthermore, the anchor and scale configuration program 110A, 110B may be distributed in its operation over multiple devices, such as client computing device 102 and server 112. The anchor and scale configuration method is explained in further detail below with respect to FIG. 2.

Figure 2:
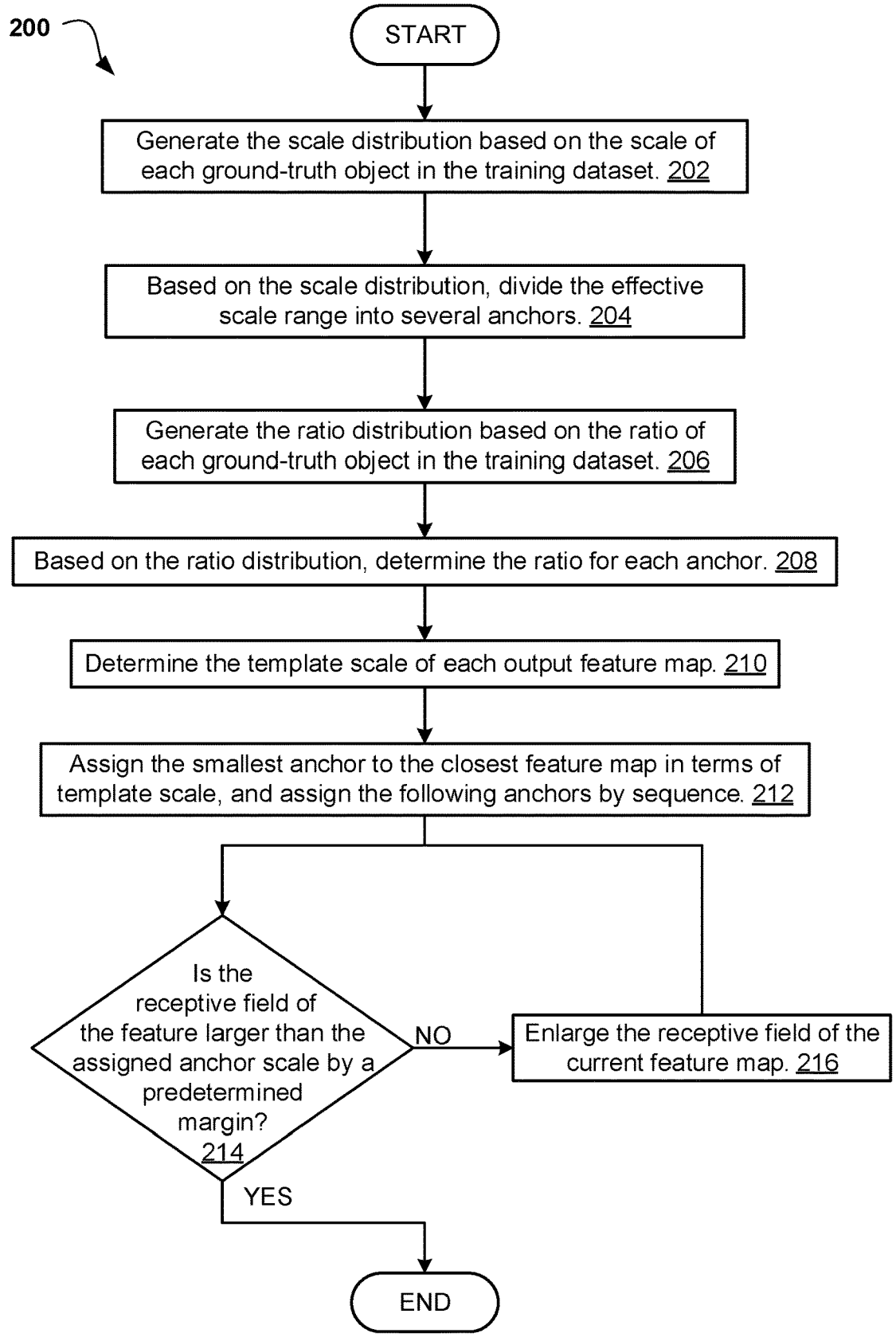
FIG. 2 is an operational flowchart illustrating an anchor and scale configuration process according to at least one embodiment.

Referring now to FIG. 2, an operational flowchart illustrating an anchor and scale configuration process 200 is depicted according to at least one embodiment. At 202, the anchor and scale configuration program 110A, 110B generates the scale distribution based on the scale of each ground-truth object in the training dataset. The distribution of scales of the ground truth objects represents a range of probable sizes of objects that could exist within the training dataset; the distribution may be estimated based on scales of the ground-truth objects, and the scale probabilities are sorted from smallest to largest; the smallest scale represents the minimum probable scale in the training dataset which exceeds the threshold of probability necessary to achieve a certain level of confidence in the result, and the largest scale represents the maximum probable scale satisfying that level of confidence.

At 204, based on the scale distribution, the anchor and scale configuration program 110A, 110B divides the effective scale range into several anchors of differing scales at set intervals within the distribution. The anchor and scale configuration program 110A, 110B may use a predetermined interval to choose the number of anchors, where the interval may be a function which takes into account the scale distribution of the training dataset, such that the interval is tailored to the training dataset.

At 206, based on the ratio of each ground-truth object in the training dataset, anchor and scale configuration program 110A, 110B may generate a ratio distribution. The anchor and scale configuration program 110A, 110B generates the ratio distribution based on the ratio of each ground-truth object in the training dataset. The ratio distribution represents a range of probable proportions of objects that could exist within the dataset; the distribution may be created by selecting all ratios of the ground-truth objects which achieve a probability necessary to exceed the confidence threshold, and sorting them from smallest to largest; the smallest ratios represents the minimum ratio in the training dataset which exceeds the threshold of probability necessary to achieve a certain level of confidence in the result, and the largest scale represents the maximum probable scale satisfying that level of confidence.

At 208, based on the ratio distribution, anchor and scale configuration program 110A, 110B determines the ratio for each anchor. In some embodiments of the invention, for example where a quick response in nearly real time is desired, the anchor and scale configuration program 110A, 110B may determine the ratio for each anchor of the region proposal through a predefined approach; the predefined approach may involve using predefined ratios, and is most useful when there is insufficient time to train the ratios. Under the predefined approach, the anchor and scale configuration program 110A, 110B may select pre-defined ratios at intervals between the minimal ratio and the maximal ratio within the generated ratio distribution. For example, in some embodiments of the invention, given N ratios, the anchor and scale configuration program 110A, 110B uses unified sampling in the major ratio range, where each given ratio Ri is defined by the equation:

$$R_i = R_{min} + i * \frac{R_{max} - R_{min}}{N}, 1 \leq i \leq N.$$

In some embodiments of the invention, such as where accuracy is desirable over speed, anchor and scale configuration program 110A, 110B may determine the anchor ratios of the region proposal through a cross-validation (exploration) approach. The cross-validation approach may involve testing the different ratios to determine the accuracy of the model, and when the accuracy of the model reaches a threshold level of accuracy, anchor and scale configuration program 110A, 110B selects anchor ratios. For example, given N ratios, anchor and scale configuration program 110A, 110B may start with the first ratio, train on the training dataset, and obtain the accuracy on the validation set, then repeat with ratios 2-N, until Accuracy (i)−Accuracy(i+1)<β, where β is the accuracy threshold. The accuracy threshold may be pre-defined based on user requirements.

At 210, anchor and scale configuration program 110A, 110B determines the template scale of each output feature map. The anchor and scale configuration program 110A, 110B may determine the template scale of each output feature map by calculating, for each output feature map, the ratio of the network input size to the feature map size. The network input size may be the size of the input image that the anchor-based object detection program 108 may accept, and may vary according to the object detector 108 architecture used. For example, if the anchor-based object detection program 108 is a single stage detector, such as SSD, the network input size may be 512*512, or 300*300. In another example, where the anchor-based object detection program 108 utilizes FRCNN (two stages detector), the size of image may be long side less than 1000 pixels, short side less than 600 pixels.

At 212, anchor and scale configuration program 110A, 110B assigns the smallest anchor to the closest feature map in terms of template scale, and assigns the subsequent anchors by sequence. To put it another way, anchor and scale configuration program 110A, 110B assigns the anchor to the feature map based on the sizes of each anchor and feature map relative to the sizes of the other anchors and feature maps, respectively; the smallest anchor will be assigned to the smallest feature map, the second smallest anchor will be assigned to the second smallest feature map, and et cetera, until the largest anchor is matched with the largest feature map.

At 214, the anchor and scale configuration program 110A, 110B determines whether the receptive field of the feature is larger than the assigned anchor scale by a predetermined margin. The anchor and scale configuration program 110A, 110B may calculate the ERF based on the neural network being employed. In embodiments where the neural network and detector architecture are fixed, the ERF may be predetermined. The anchor and scale configuration program 110A, 110B may check whether the effective receptive field (ERF) is larger than the assigned scale with the following threshold:

$$\frac{ERF_i}{scale_i} > \alpha$$

According to one implementation, if the anchor and scale configuration program 110A, 110B determines that the receptive field of the feature is larger than the assigned anchor scale by a predetermined margin (step 214, "YES" branch), the anchor and scale configuration program 110A, 110B may terminate. If the anchor and scale configuration program 110A, 110B determines that the receptive field of the feature is not larger than the assigned anchor scale by a predetermined margin (step 214, "NO" branch), the anchor and scale configuration program 110A, 110B may continue to step 216 to enlarge the receptive field of the current feature map.

At 216, the anchor and scale configuration program 110A, 110B may enlarge the receptive field of the current feature map. The anchor and scale configuration program 110A, 110B may enlarge the receptive field of the current feature map using a feature pyramid network (FPN). A FPN may generate multiple feature map layers (multi-scale feature maps); if each ERF is larger than the scale_max, then the deepest feature map could include the object features. Accordingly, anchor and scale configuration program 110A, 110B may enlarge the receptive field of the feature map until the receptive field exceeds the anchor scale by a predetermined margin.

It may be appreciated that FIG. 2 provides only an illustration of one implementation and does not imply any limitations with regard to how different embodiments may be implemented. Many modifications to the depicted environments may be made based on design and implementation requirements. For example, in some embodiments, anchor and scale configuration program 110A, 110B may operate a camera to gather image data for performing multi-scale image detection.

Figure 3:
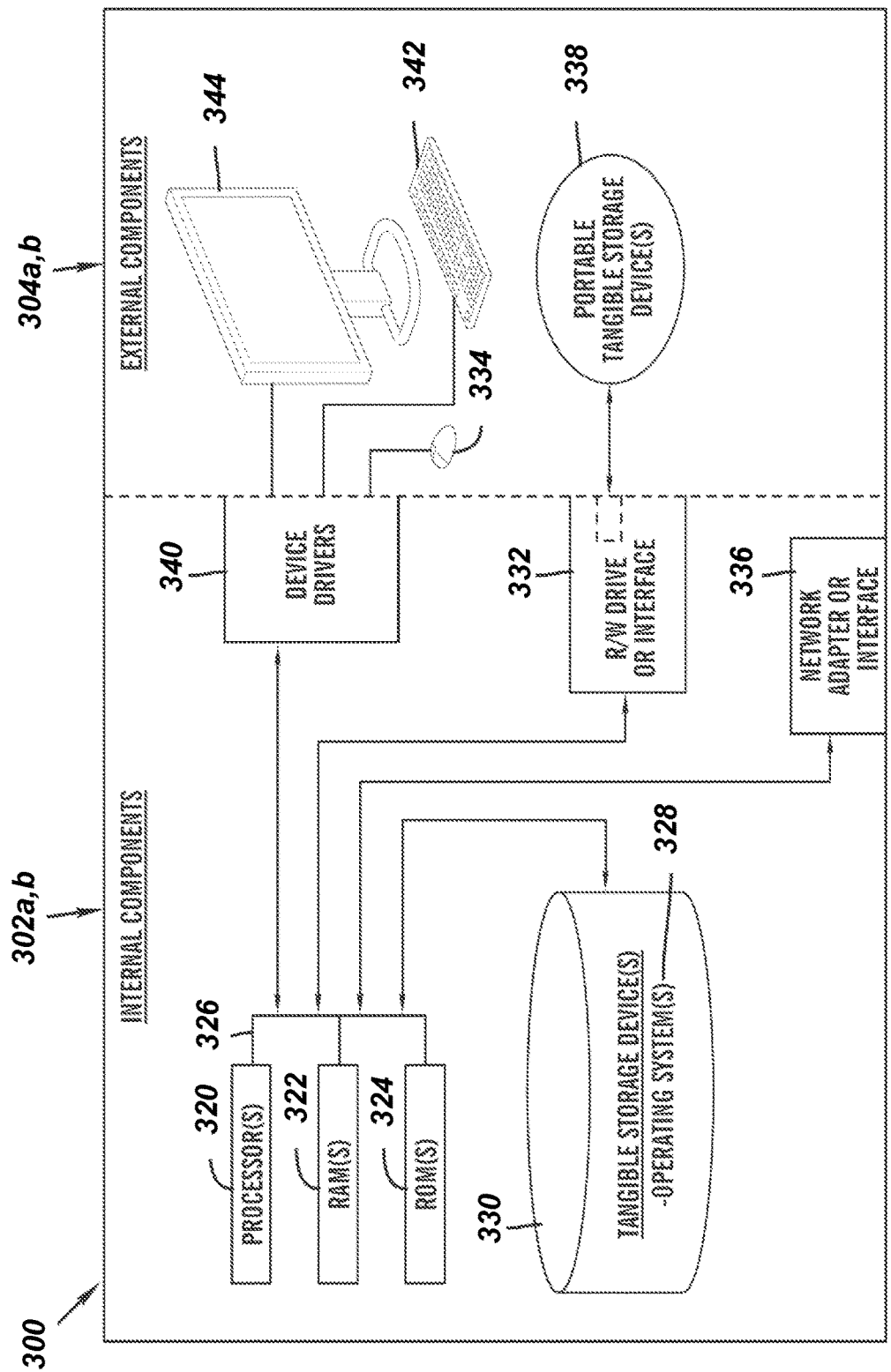
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 a,b and external components 304 a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the anchor-based object detection program 108 and the anchor and scale configuration program 110A in the client computing device 102, and the anchor and scale configuration program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the anchor and scale configuration program 110A, 110B, can be stored on one or more of the respective portable computer-readable tangible storage devices 338, read via the respective R/W drive or interface 332, and loaded into the respective hard drive 330.

Each set of internal components 302 a,b also includes network adapters or interfaces 336 such as a TCP/IP adapter cards, wireless Wi-Fi interface cards, or 3G or 4G wireless interface cards or other wired or wireless communication links. The anchor-based object detection program 108 and the anchor and scale configuration program 110A in the client computing device 102 and the anchor and scale configuration program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the anchor-based object detection program 108 and the anchor and scale configuration program 110A in the client computing device 102 and the anchor and scale configuration program 110B in the server 112 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. External components 304 a,b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
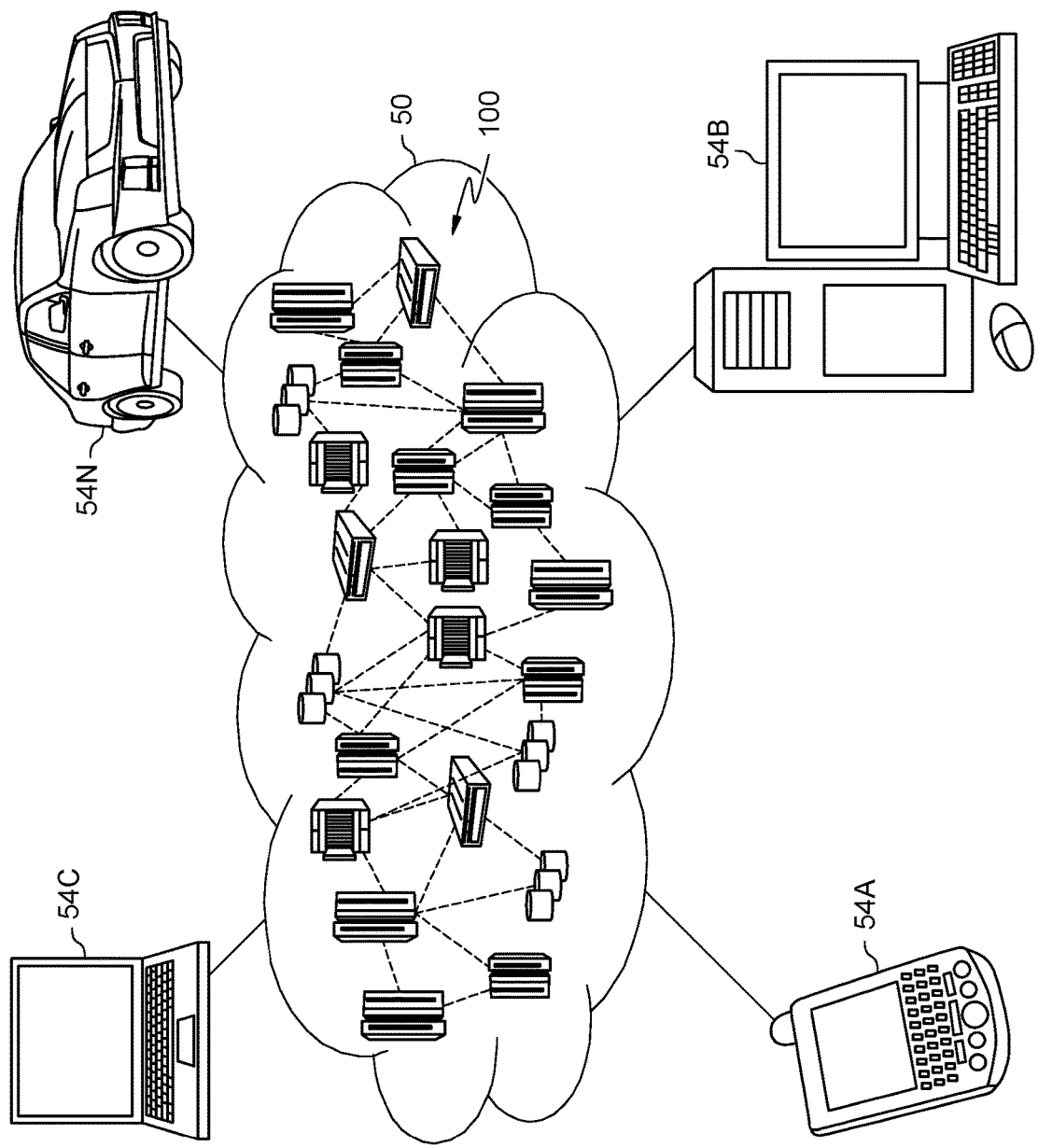
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
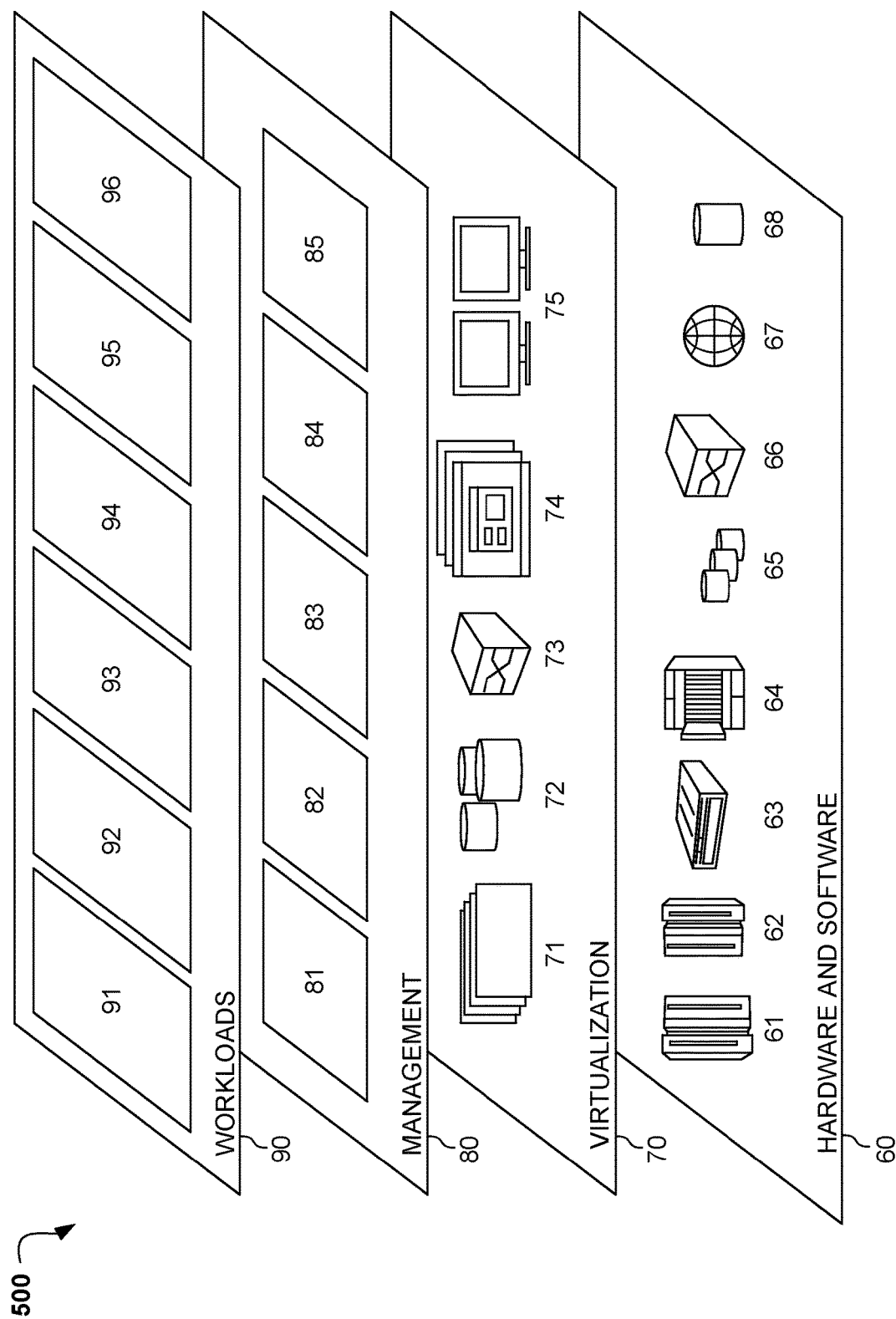
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and anchor and scale configuration 96. The anchor and scale configuration 96 may relate to generating anchors and selecting feature maps for a multi-scale object detection program based on analysis of the dataset.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for generating anchors and selecting feature maps for a multi-scale object detection program, the method comprising:

generating a scale distribution of one or more scales of one or more ground-truth objects;

based on the scale distribution, dividing the effective scale range into a number of anchors greater than zero;

generating a ratio distribution of one or more ratios of the one or more ground-truth objects;

generating a ratio for at least one of the number of anchors;

determining a template scale of one or more feature maps; and assigning the number of anchors to the one or more feature maps based on a relative size of a scale of one of the anchors matching a relative size of a template scale of one of the feature maps.

2. The method of claim 1, further comprising: responsive to determining that a receptive field of one of the one or more feature maps is larger than an assigned anchor scale by a predetermined margin, enlarging the receptive field of the feature map.

3. The method of claim 1, wherein generating a ratio for at least one of one or more anchors comprises:
selecting a number of ratios at predetermined intervals within the ratio distribution, wherein the number of ratios is equal to the number of anchors; and
matching each selected ratio to one of the one or more anchors based on the relative size of one of the selected ratios matching the relative size of one of the scales of the number of anchors.

4. The method of claim 1, wherein generating a ratio for at least one of one or more anchors comprises:
assigning one of the one or more ratios with one of the one or more anchors;
testing the assigned anchor against to obtain an accuracy;
responsive to the accuracy exceeding a threshold, matching the ratio of the one or more ratios to the anchor.

5. The method of claim 1, wherein the template scale comprises the ratio of network input size and feature map size.

6. The method of claim 1, wherein the number of anchors is determined based on an interval described by a function that takes into account a minimum and maximum scale of a training dataset.

7. The method of claim 2, wherein the receptive field of the feature map is enlarged using a feature pyramid network.

8. A computer system for generating anchors and selecting feature maps for a multi-scale object detection program, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
generating a scale distribution of one or more scales of one or more ground-truth objects;
based on the scale distribution, dividing the effective scale range into a number of anchors greater than zero;
generating a ratio distribution of one or more ratios of the one or more ground-truth objects;
generating a ratio for at least one of the number of anchors;
determining a template scale of one or more feature maps; and
assigning the number of anchors to the one or more feature maps based on a relative size of a scale of one of the anchors matching a relative size of a template scale of one of the feature maps.

9. The computer system of claim 8, further comprising: responsive to determining that a receptive field of one of the one or more feature maps is larger than an assigned anchor scale by a predetermined margin, enlarging the receptive field of the feature map.

10. The computer system of claim 8, wherein generating a ratio for at least one of one or more anchors comprises:
selecting a number of ratios at predetermined intervals within the ratio distribution, wherein the number of ratios is equal to the number of anchors; and
matching each selected ratio to one of the one or more anchors based on the relative size of one of the selected ratios matching the relative size of one of the scales of the number of anchors.

11. The computer system of claim 8, wherein generating a ratio for at least one of one or more anchors comprises:
assigning one of the one or more ratios with one of the one or more anchors;
testing the assigned anchor against to obtain an accuracy;
responsive to the accuracy exceeding a threshold, matching the ratio of the one or more ratios to the anchor.

12. The computer system of claim 8, wherein the template scale comprises the ratio of network input size and feature map size.

13. The computer system of claim 8, wherein the number of anchors is determined based on an interval described by a function that takes into account a minimum and maximum scale of a training dataset.

14. The computer system of claim 8, wherein the receptive field of the feature map is enlarged using a feature pyramid network.

15. A computer program product for generating anchors and selecting feature maps for a multi-scale object detection program, the computer program product comprising:
one or more computer-readable tangible storage medium and program instructions stored on at least one of the one or more tangible storage medium, the program instructions executable by a processor to cause the processor to perform a method comprising:
generating a scale distribution of one or more scales of one or more ground-truth objects;
based on the scale distribution, dividing the effective scale range into a number of anchors greater than zero;
generating a ratio distribution of one or more ratios of the one or more ground-truth objects;
generating a ratio for at least one of the number of anchors;
determining a template scale of one or more feature maps; and
assigning the number of anchors to the one or more feature maps based on a relative size of a scale of one of the anchors matching a relative size of a template scale of one of the feature maps.

16. The computer program product of claim 15, further comprising: responsive to determining that a receptive field of one of the one or more feature maps is larger than an assigned anchor scale by a predetermined margin, enlarging the receptive field of the feature map.

17. The computer program product of claim 15, wherein generating a ratio for at least one of one or more anchors comprises:
selecting a number of ratios at predetermined intervals within the ratio distribution, wherein the number of ratios is equal to the number of anchors; and
matching each selected ratio to one of the one or more anchors based on the relative size of one of the selected ratios matching the relative size of one of the scales of the number of anchors.

18. The computer program product of claim 15, wherein generating a ratio for at least one of one or more anchors comprises:
assigning one of the one or more ratios with one of the one or more anchors;
testing the assigned anchor against to obtain an accuracy;
responsive to the accuracy exceeding a threshold, matching the ratio of the one or more ratios to the anchor.

19. The computer program product of claim 15, wherein the template scale comprises the ratio of network input size and feature map size.

20. The computer program product of claim 15, wherein the number of anchors is determined based on an interval described by a function that takes into account a minimum and maximum scale of a training dataset.

* * * * *